June 6, 1967   S. LERMAN   3,323,151
PORTABLE PADS

Filed Feb. 3, 1965   3 Sheets-Sheet 1

INVENTOR.
SAMUEL LERMAN
BY Alfred W Petchaft
ATTORNEY

June 6, 1967  S. LERMAN  3,323,151
PORTABLE PADS
Filed Feb. 3, 1965  3 Sheets-Sheet 2

INVENTOR.
SAMUEL LERMAN
BY Alfred W Petchaft
ATTORNEY

INVENTOR.
SAMUEL LERMAN
BY Alfred W Petchaft
ATTORNEY

United States Patent Office 3,323,151
Patented June 6, 1967

3,323,151
PORTABLE PADS
Samuel Lerman, Ballwin, Mo., assignor to Milbern
Company, St. Louis, Mo., a partnership
Filed Feb. 3, 1965, Ser. No. 430,016
9 Claims. (Cl. 5—345)

The invention relates in general to easily portable pads which can be used for seating, reclining and similar purposes.

Seating pads and similar devices which are now available are conventionally constructed of porous or loosely woven matting and are filled with metallic springs or similar semi-resilient stuffing. Consequently, such pads are relatively stiff, rigid, and expensive. Moreover, such pads are not particularly portable and the type of construction involved is not readily adaptable to variations in size and shape so as to provide pads for different purposes. Finally, the type of construction employed in conventional seat pads is of such a nature that a great deal of hand-labor is ordinarily required and it is quite difficult, if not well-nigh impossible, to apply automated manufacturing techniques.

It is, therefore, the primary object of the present invention to provide a lightweight, soft, resilient and durable pad which is readily adapted for seating or reclining purposes.

It is also an object of the present invention to provide a pad of the type and for the purposes stated which is simple, economical in construction and can be readily fabricated by automated manufacturing techniques.

It is another object of the present invention to provide a pad of the type and for the purposes stated which can be readily folded up into a very compact form so that it can be easily stored or carried from place to place.

It is also an object of the present invention to provide a pad of the type stated with self-contained hand-grip elements by which the pad can be readily carried about from place to place by the user. Said hand-grips, furthermore, being of such construction will not interfere in any way with the utility of the pad for purposes for seating or reclining.

It is an additional object of the present invention to provide a pad of the type stated which, in some sizes, is extremely well adapted for use as a seat-cushion at sporting events and in automobiles.

It is a further object of the present invention a pad of the type stated which, in other sizes, is extremely well adapted for use as a floor pad for station wagons and the like.

With the above and other objects in view, my invention resides in the novel features of form, construction, arrangement, and combination of parts presently described and pointed out in the claims.

In the accompanying drawings (3 sheets):

FIG. 1 is a perspective view of a single-unit seat pad constructed in accordance with and embodying the present invention;

FIGS. 2 and 3 are sectional views taken along lines 2—2 and 3—3 respectively of FIG. 1;

Figure 5:
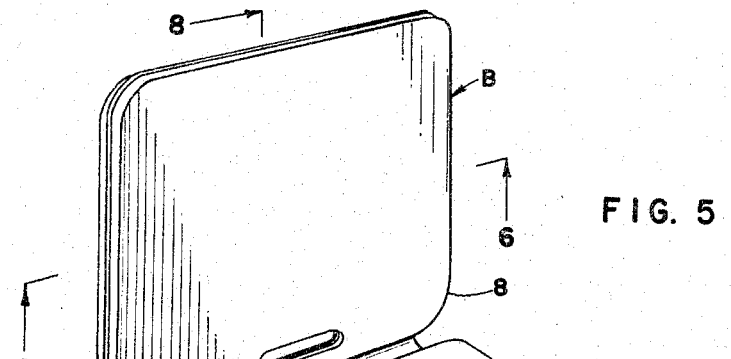
FIG. 5 is a perspective view of the two-unit seat pad constructed in accordance and embodying the present invention.
Figure 8:
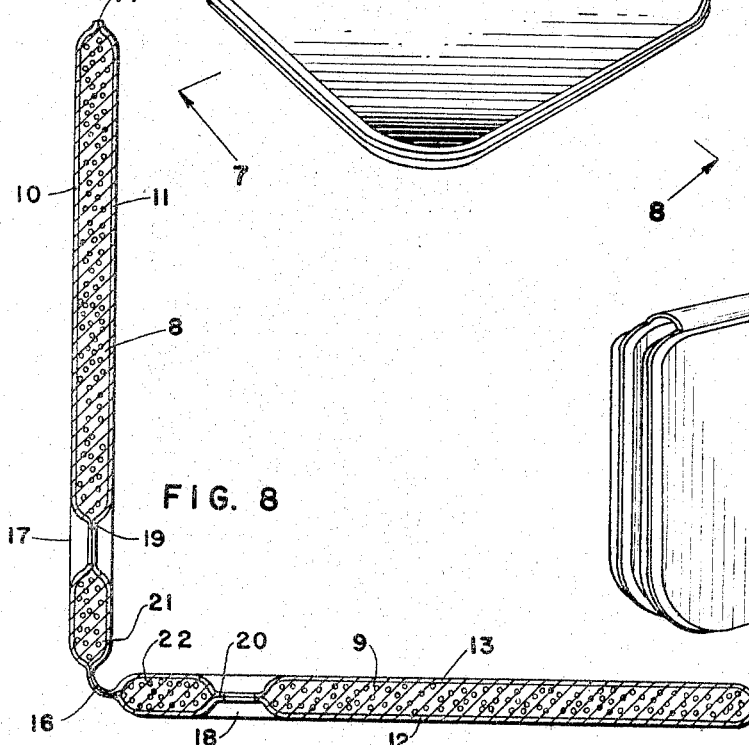
Figure 9:
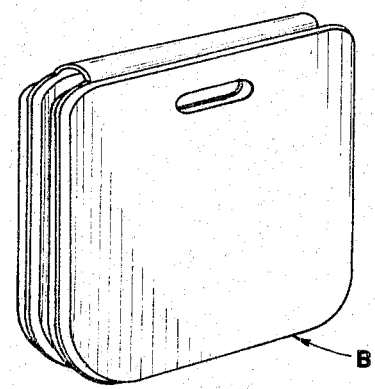
Figure 6:
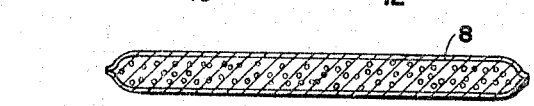
Figure 7:
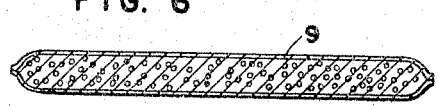
Figure 10:
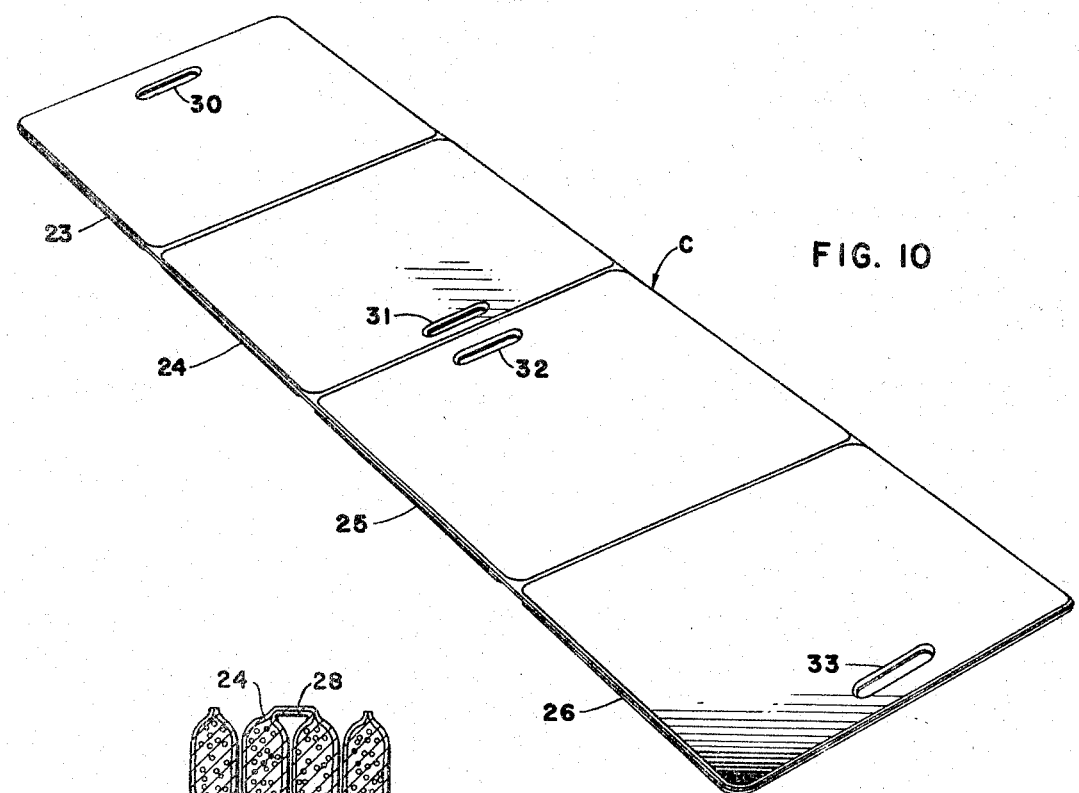
Figure 12:
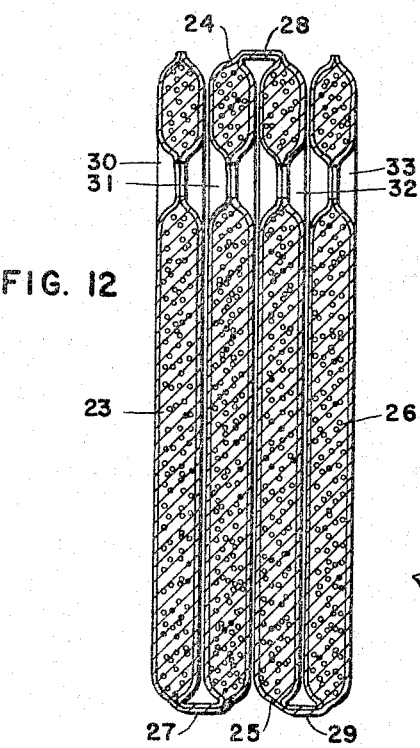
Figure 11:
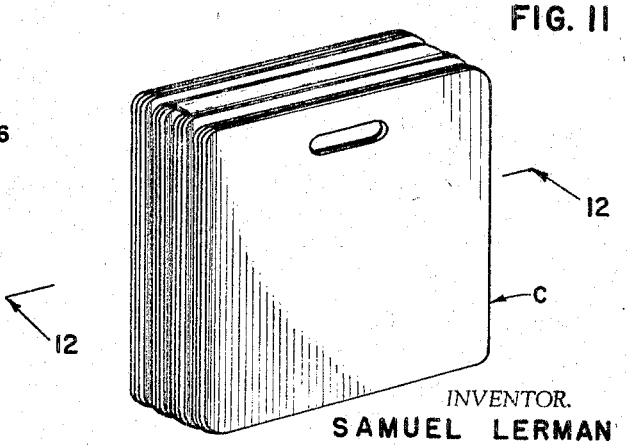

FIGS. 6, 7, and 8 are sectional views taken along lines 6—6, 7—7 and 8—8 respectively of FIG. 5;

FIG. 9 is a perspective view of the two-unit seat pad in vertical or so called "carrying position";

FIG. 10 is a perspective view of a multiple-unit cushion pad constructed in accordance with and embodying the present invention;

FIG. 11 is a perspective view of the multiple-unit cushion pad in vertical or so called "carrying position"; and FIG. 12 is a sectional view taken along line 12—12 of FIG. 11.

Referring now in more detail and by reference characters to the drawings which illustrate a preferred embodiment of the present invention, A designates a seat pad of the single-unit type comprising a relatively thick section of foamed thermoplastic synthetic resin, such as polyvinyl chloride, polyurethane, polyether or polyester resin. Actually the chemical constituency is not critical provided the material possesses the desired physical characteristics. In other words, it must have a myriad of small preferably closed cells so as to be relatively light in weight but nevertheless of resilient "sponginess." In addition, it must be thermoplastic so that it can be cut-seamed in heated dies. Finally, it must be eight sheeted with a non-porous skin on the top and bottom surfaces of the sheet or must be capable of forming such a surface-skin when subject to heated dies or platens.

Figure 1:
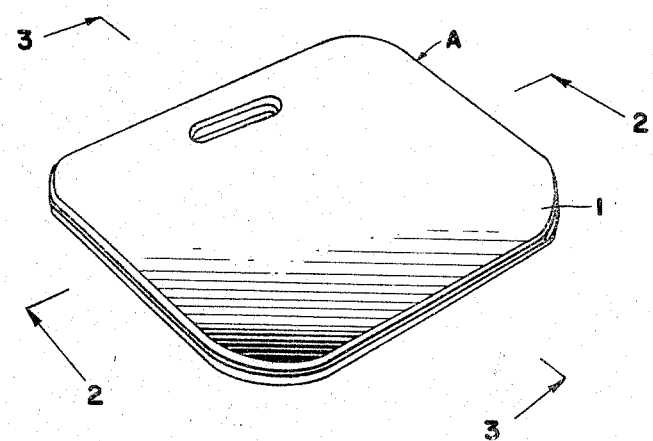
Figure 2:
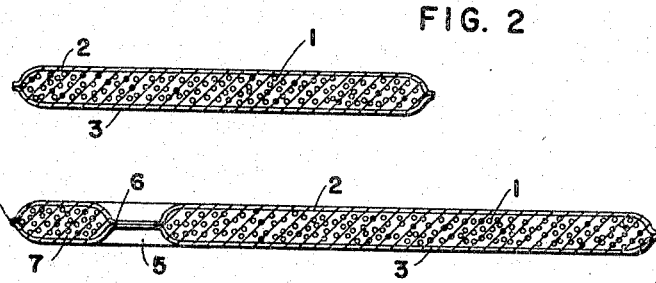
Figure 3:
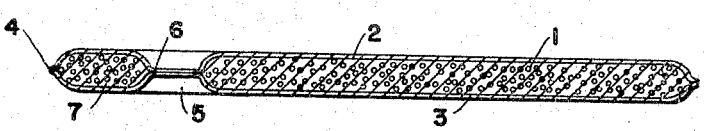
Figure 4:
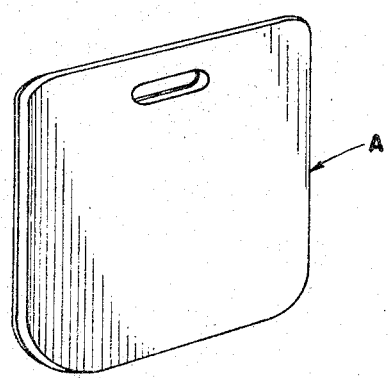
FIG. 4 is a perspective view of the two-unit seat pad in vertical or so-called "carrying position"

The seat-pad A includes a round cornered rectangular element of closed-cell internal structure which top and bottom non-pervious surfaces 2, 3 which are marginally rounded over and welded together in the provision of a continuous cut-seam 4. Adjacent to one of its margins, the seat-pad A is provided with an oblong-rectangular opening 5 which is internally defined by a continuous annular cut-seam 6. The opening 5 is sufficiently close to the adjacent margin of the seat-pad A so as to provide convenient sized hand-grip 7, as best seen in FIGS. 1 and 4.

The seat-pad A can be placed on the surface of any conventional seating structure as a bleacher seat, automobile seat, or the concrete seat-forming step of a sports amphitheatre. It has been found in connection with the present invention that the seat-pad A having a thickness in the range of 1.25 in. to 1.50 in. with a foam density of 1 to 1.25 lbs. per cu. ft. will provide a very high degree of seating comfort. Moreover, the seat-pad A can be lifted to the position more or less shown in FIG. 4 and carried about by the hand-grip 7. It can also be lifted in a vertical position and rested against a wall or similar structure to provide a back-rest pad. Because of the closed cell structure the seat-pad A will not lose its resiliency and has the further advantage of insulating the posterior of the human anatomy from the extremes of heat or cold which might be encountered in open-air sports arenas. In addition to this, the closed-cell structure serves to protect the user from moisture or dampness which may have accumulated on the seating structure.

It should also be noted in this connection that the seat-pad A by reason of its unique structure can readily be manufactured in a very simple manner, by feeding an appropriately sized sheet of foamed synthetic resin between a pair of heated dies which are then brought together so that the seat-pad A will be formed and cut-seamed in a single operation. The sheets of synthetic resin can be formed in a range of colors so that the seat-pad A will have an attractive appearance.

It is also possible to provide a modified form of seat-pad B of the two-unit type which comprises a relatively thick section of foamed, closed-cell, synthetic resin of the type heretofore described which is cut-seamed to provide upper and lower, round cornered rectangular elements 8, 9 each of which have top and bottom non-pervious surfaces 10, 11, 12, 13, respectively, which are marginally rounded over and welded together in the provision of continuous cut-seams 14, 15, and an intermediate relatively wide hinge forming element 16, which, like the cut-seams 14, 15 will be formed by heat compression of the thermoplastic material. The elements 8, 9 are provided with oblong openings 17, 18, which are defined by cut-seams 19, 20 and are located in such a position that when the elements 8, 9 are folded into overlying position, openings 17, 18 will lie in substantial registration, more or less as shown in FIG. 9. The intervening portions of the seat pads between the openings 17, 18, and the hinge-connected edges of the elements 8, 9 form hand-grips 21, 22.

The seat-pad B, very much like the seat-pad A, is light in weight, durable and attractive in appearance. Moreover, it can be manufactured by automated manufacturing equipment so it can be produced at a high rate of speed and minimum cost.

It is also possible to provide another modified form of cushioning pad C as shown in FIGS. 10–12 inclusive. The cushioning pad C consists of four round-cornered-oblong rectangular elements, 23, 24, 25, 26, which are substantially similar in construction to the previously described seat pad elements 8, 9, and are hingedly connected by intermediate compressed strips of plastic material 27, 28, 29. Adjacent, the hinge forming strip 27, the pads 23, 24 are provided with openings 30, 31 and similarly adjacent to the hinge forming strip 29, the pads 25, 26 will provide with openings 32, 33. When the cushioning pad C is folded up in the manner shown in FIG. 11, even though the resulting configuration is rather thick, it is still sufficiently compact so that cushioning pad C is conveniently carried by hand. It will, of course, be apparent that the cushioning pad C can be made in any convenient perimetral size and can be made large enough to fit on the floor of a conventional station wagon so that the children can recline or play during travel. Moreover, cushioning pads similar to the cushioning pad C can be made in any desired number of hingedly connected sections.

It should be understood that changes and modifications in the form, construction, arrangement, and combination of the several parts of the portable pads may be made and substituted for those herein shown and described without departing from the nature and principle of my invention.

Having thus described my invention, what I claim and desire to secure by Letters Patent is:

1. A portable pad consisting of an uncovered section of resilient foamed material marginally bounded by a continuous perimetral heat-seam, said section being provided with at least one elongated opening located adjacent a margin and adapted to form a hand-grip, said opening also being bounded by a heat-seam.

2. A portable pad consisting of an uncovered section of resilient foamed thermoplastic material marginally bounded by a continuous perimetral heat-formed cut-seam, said section being provided with at least one elongated opening located adjacent a margin and adapted to form a hand-grip, the margin of said opening being a heat-formed cut-seam.

3. A portable pad consisting of an uncovered section of resilient foamed thermoplastic material marginally bounded by a continuous perimetral heat-foamed cut-seam, said pad being arcuately curved in cross-sectional shape across its top and bottom edges around its entire perimeter, said section being provided with at least one elongated opening and adapted to form a hand-grip, the margin of said opening being a heat-formed cut-seam.

4. A portable pad consisting of a section of resilient foamed thermoplastic material marginally bounded by a continuous perimetral heat-formed cut-seam, said section being uncovered so that the foamed material is exposed, said pad being arcuately curved in cross-sectional shape symmetrically across its top and bottom edges around its entire perimeter, said section being provided with at least one elongated opening adjacent one of its sides and adapted to form a hand-grip, the margin of said opening being a heat-formed cut-seam.

5. A portable pad consisting of a plurality of congruent pad sections formed from a single sheet of resilient foamed thermoplastic material and marginally bounded by a continuous perimetral heat-formed seam, each section being uncovered so that the foamed material is exposed, each of said sections being joined to another section by an integral heat-formed hinge of a thickness substantially less than the thickness of the pad sections so that the pad sections can be folded over onto one another in marginally registered stacked relation.

6. A portable pad according to claim 5 in which the cross-section of the adjacent margins of the pads on both sides of the hinge is V-shaped.

7. A portable pad consisting of first, second, third, and fourth equally-sized rectangular pad sections formed from a single sheet of resilient foamed thermoplastic material and each marginally bounded by a continuous perimetral heat-formed seam, each of said sections being uncovered so that the foamed material is exposed, said first section being joined to said second section by a first integral heat-formed hinge, said second section being joined to said third section by a second integral heat-formed hinge, said third section being joined to said fourth section by a third integral heat-formed hinge, said heat-formed hinges being parallel, whereby said pad sections can be folded over onto one another in marginally registered stacked relation, said second and third pad sections being provided in close proximity to the second hinge with elongated apertures defined by heat-seamed margins which register when the second and third pad sections are folded over onto one another, said first and fourth pad sections being provided in close proximity to their end margins located opposite to the first and third hinges, respectively, with elongated apertures defined by heat-seamed margins which register with one another and with the elongated apertures of the second and third pad sections when the pad sections are folded over into stacked relation whereby to form a hand-grip.

8. A portable pad consisting of two congruent pad sections formed from a single sheet of resilient foamed material marginally bounded by a continuous perimetral heat-seam, each of said sections being joined to the other section by an integral heat-formed hinge of a thickness substantially less than the thickness of each pad section so that the pad sections can be folded over into facewise abutment and marginally registered relation with respect to each other, each of said pad sections being provided centrally along one of its hingedly connected margins with an elongated aperture having a heat-seamed margin, said apertures being in marginal registration when the pad sections are folded over onto one another and being spaced inwardly from such hinge margin so that the material of the pad section between the aperture and the hinge margin forms a hand-grip, said pad sections being uncovered so that the foamed material is exposed.

9. A portable pad consisting of four congruent pad sections formed from a single sheet of resilient foamed thermoplastic material marginally bounded by a continuous perimetral heat-formed seam, each of said sections being joined to another section by an integral heat-formed hinge of a thickness substantially less than the thickness of said pad sections so that the pad sections can be folded over onto one another in marginal registered stacked relation, each of said pad sections being provided centrally along one of its hingedly connected margins with an elongated aperture spaced inwardly from such margin so that the material of the pad between the aperture and the margin forms a hand-grip, said elongated apertures being in marginal registration when the pad sections are folded over onto one another in stacked relation, said pad sections being uncovered so that the foamed material is exposed.

References Cited

UNITED STATES PATENTS

| | | | |
|---|---|---|---|
| 2,061,664 | 11/1936 | Lincoln | 5—345 |
| 2,738,834 | 3/1956 | Jaffe et al. | 5—344 |
| 2,834,970 | 5/1958 | Nappe | 5—344 |
| 3,042,940 | 7/1962 | Keaton | 5—337 |
| 3,112,956 | 12/1963 | Schicker et al. | 5—348 |

DAVID J. WILLIAMOWSKY, *Primary Examiner.*

A. M. CALVERT, *Assistant Examiner.*